United States Patent Office 3,406,136
Patented Oct. 15, 1968

3,406,136
INJECTION MOLDING COMPOSITIONS CONTAINING VINYL CHLORIDE POLYMER, ABS GRAFT COPOLYMER AND PLASTICIZER MIXTURE
Luciano Scarso and Mario Bevilacqua, Milan, and Bruno Pozzer, Mestre, Venezia, Italy, assignors to Montecatini Edison S.p.A., Milan, Italy
No Drawing. Filed Oct. 12, 1964, Ser. No. 403,392
Claims priority, application Italy, Oct. 11, 1963, 20,909/63
3 Claims. (Cl. 260—23.7)

ABSTRACT OF THE DISCLOSURE

Thermoplastic for injection molding consisting of an intimate mixture of 51 to 98% by weight of a vinylchloride polymer containing at least 85% chemically combined vinylchloride and having a Fickentscher K number between 40 and 80, from 1 to 40% by weight of an acrylonitrile-butadiene-styrene graft copolymer formed by polymerizing a mixture of at least one styrene-type compound and one acrylonitrile-type compound with a latex of a synthetic elastomer containing at least 85% by weight of polymerized butadiene, the graft copolymer consisting essentially of 30 to 60% by weight polymerized butadiene, 30 to 52.5% by weight of said styrene-type compound in polymerized form and from 10 to 17.55% by weight of said acrylonitrile-type compound in polymerized form, and 1 to 15% by weight of a plastifying-component selected from the group which consists of epoxidized soy bean oil, epoxidized esters of alkanoic acids having from 10 to 20 carbon atoms and alkyl alcohols having from 2 to 20 carbon atoms, esters of alkanoic acids having from 10 to 20 carbon atoms with alkyl alcohols having from 2 to 20 carbon atoms and mixtures thereof.

---

The present invention relates to thermoplastic polymeric compositions suitable for use with conventional injection-molding machines and processes.

It is well-known that thermoplastic polymers in a comminuted or pulverulent form may be plasticized or masticated by mechanical kneading techniques prior to injection into a mold wherein the thermoplastic, which has been rendered fluent by the heat developed during kneading and the application of injection pressure, cools to enable the mold to be opened and the shaped parts removed. Injection-molding of this type is carried out with a variety of materials, especially plasticized materials with which a plasticizer is mixed prior to an introduction into the molding machine. One of the more common polyvinyl thermoplastics for this purpose is that identified as "plasticized," "nonrigid" or "modified" to distinguish the plastisols of this material from rigid and unmodified polyvinyls. In general, the plasticized thermoplastic may be able to withstand the rigors of the injection in the molding process to a greater extent than the unmodified or rigid polymer. In fact, the use of conventional injection-molding apparatus, having plasticizing mastication and kneading screws or the like, renders the use of rigid polyvinyl chlorides, for example, highly difficult because of thermal degradation or burning of the polymer. The care that must be taken to avoid deterioration of the polymer increases the expense of the process and gives rise to products whose mechanical characteristics are not as satisfactory as those which could be expected from the nature of the starting materials. In order to improve the properties of vinyl chloride polymers, it has been proposed to admix them intimately with a copolymer of acrylonitrile, butadiene and styrene, a terpolymer of this character being identified hereinbelow as an ABS terpolymer. These latter substances have the physical characteristics, when isolated, of elastomers and markedly improve the physical properties of the injection-molded products when used in conjunction with polyvinyl chlorides. Even mixtures of this type, however, have been found difficult to mold by conventional apparatus when, for instance, a mixture of four parts by weight of polyvinyl chloride and one part by weight of the terpolymer is molded in an apparatus having a masticating and kneading screw, even though the usual stabilizer and lubricating agent are employed, the thermoplastic mass progressively increases in temperature with increasing reddening until thermal degradation of the thermoplastic mass results with gumming up of the terminal zone of the screw.

It is, therefore, the principal object of the present invention to provide an improved thermoplastic composition suitable for injection-molding with conventional processes and apparatus without, however, experiencing the thermal degradation characterizing earlier compositions for this purpose.

Still another object of this invention is to provide an injection-moldable thermoplastic composition of the character described, capable of being used in equipment suitable for conventional molding of polymeric vinyl chlorides.

These objects and others which will be apparent hereinafter, have been attained, in accordance with the present invention, through the provision of a polymeric composition consisting essentially of three components in intimate admixture, namely:

(a) a polyvinyl-chloride component constituting the major part of the mixture, i.e. from 51 to 98% by weight thereof; (b) an ABS-terpolymer component preferably constituting the major fraction of the remainder and present in an amount ranging between substantially 1 and 40% by weight of the mixture; (c) and a plastifying component constituting between substantially 1 and 15% by weight of the mixture and consisting of a compound capable of fluidifying the polyvinyl-chloride and ABS-terpolymer components, this plastifying component consisting of one or more long-chain epoxides (e.g. epoxidized oils and esters) and/or esters of alkanoic (alkyl or alkene carboxylic) acids and alcohols. This product can be molded in conventional apparatus for the treatment of rigid vinylchloride polymers without the disadvantages characterizing same.

It has been found that best results are obtained when the vinyl-chloride polymer of the present invention contains at least 85% by weight of chemically combined vinyl chloride and thus can consist entirely of the chemically combined or polymerized substances alone or in the presence of other monomers copolymerizable with vinyl chloride. The chemically combined vinyl chloride should have, according to an important feature of this invention, a Fickentscher K-number ranging between substantially 40 and 80 but preferably from 50 to 70. The unmodified vinyl-chloride polymer can be used as supplied and manufactured or in the form of a substance to which have been added the usual stabilizing agents preventing photodegradation and thermal degradation as well as the conventional lubricants employed in the injection-molding field.

According to the present invention, the ABS-terpolymer component is a compound prepared from the products of the graft-polymerization of vinylic and/or vinylidenic monomers onto a backbone of synthetic elastomer of the type produced by polymerizing dienes. The terpolymer can thus be formed from an aqueous suspension or latex of the synthetic elastomer which must contain a high percentage of chemically combined conjugated dienic hydrocarbon, the ethylenically unsaturated component consisting of at least 60 to 80 parts by weight of a styrenic monomer (e.g. styrene, alkyl-substituted styrene-based compound) together with 20 to 40 parts by weight of a monomer having an acrylonitrile skeleton. The acrylonitrile-based monomer can be acrylonitrile itself, methacrylonitrile, chloroacrylonitrile or vinylidene cyanide, present alone or in admixture. Suitable styrene-based monomers include alpha - methyl-styrene, methylethylstyrene and mono- and dichlorostyrenes. Best results are, however, obtained when the monomer mixture of the ABS-terpolymer component, adapted to be graft-polymerized onto the elastomer, consists of 65–75% by weight of styrenic monomer, the balance being acrylonitrile (25 to 35 parts by weight to 65 to 75 parts by weight of styrene or alpha-methylstyrene). While a wide range of proportions are suitable with respect to the mixture of monomers and the elastomer, it has been found that best results are obtained when the copolymerization is carried out in such manner that the ABS-terpolymer consists essentially of 30 to 60% by weight of chemically combined butadiene, 30 to 52.5% by weight of styrene or styrenic compounds, and 10 to 17.5% by weight of acrylonitrile or acrylonitrile-based compounds.

As previously indicated, the synthetic elastomer consists primarily (i.e. at least 85% by weight) of chemically combined dienic compounds (e.g. butadiene, isoprene or chloroprene or combinations thereof) together with compounds capable of forming elastomers therewith as, for example, styrene, acrylonitrile and the like—present in amounts up to 15% by weight of the elastomer.

According to a further feature of the present invention, the plastified compound can be an expoxidized soybean oil and/or one or more esters of saturated or unsaturated mono- or dicarboxylic fatty acids (generally designated herein as alkanoic acids for convenience) having a carbon number ranging from substantially 10 to 20 esterified with saturated or unsaturated mono- or polyhydric alcohols having carbon numbers from 2 to 20. As indicated, these esters may contain some epoxy groups in the alcohol or acid chain. Of particular significance for the purposes of the present invention have proved to be the epoxyalkyl-stearates of which the most useful is epoxyoctylstearate; other compounds capable of functioning in the plastifying component of the present invention are the alkylic stearates (e.g. butylstearates) and the stearic esters of polyhydric alcohols (e.g. glycerine monostearate) and epoxydized soybean oil having a low iodine number, and an oxiranic-oxygen percentage of 6–7%. Each of these plastifying agents can be used alone or in admixture with one or more of the others and in combination with additives (such as pigments, fillers and the like e.g. carbon black) as commonly used for the injection-molding of polyvinyl chlorides, polystyrene and the like.

It should be further noted that optimum results are used when the polyvinyl chloride component constituents 60 to 90% by weight of the intimate mixture, while the ABS-terpolymer component constituents 6 to 30% by weight thereof and the plastifying agent constitutes 4 to 10% by weight. It has been found to be desirable to produce the mixture before injection-molding by first intimately mixing the ABS-terpolymer with the plastifying component and then adding the mixture thus produced to the vinyl-chloride polymer or vice versa, thereafter subjecting the entire mixture to vigorous agitation and blending. The following examples are provided for the purpose of illustrating the present invention:

EXAMPLE I

Preparation of the components of the injection-molding composition (a) Polyvinyl-chloride component. — 100 parts by weight of polyvinychloride having a Fickentscher K-number of 60 were mixed with 2.5 parts by weight lead sulphate, 2 parts by weight dibasic lead phosphite and 3 parts by weight lead stearate in a Henschel mixer.

(b) ABS-terpolymer component.—278 gm. of water at room temperature were added to 170 gm. of a latex suspension, containing 109.5 gm. of a butadiene-styrene copolymer containing 95% by weight of chemically combined butadiene.

Subsequently, 98.5 gm. of a monomeric mixture containing 73% by weight of styrene and 27% by weight of acrylonitrile, 0.4 gm. of potassium persulphate, 1 gm. of sodium dodecylbenzenesulphonate, 0.3 gm. of a condensation product of formaldehyde and a sodium salt of an alkyl naphthalenesulphonic acid, and 0.63 gm. of a buffering agent (e.g. NaHCO₃), were added separately to the aqueous latex suspension. The mixture was then subjected to polymerization for a period of 6 hrs., first at 70° C. and then, with gradual temperature increase, at 100° C.

The weight composition of the graft copolymer thus obtained, in terms of chemically combined monomers, was the following:

| | Percent |
|---|---|
| Butadiene | 50 |
| Acrylonitrile | 12.75 |
| Styrene | 37.25 |

(c) Plastifying component.—An octylepoxystearate was used, with the formula:

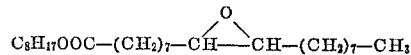

This alkyl epoxy stearate had a molecular weight of 410.69, a specific gravity of 0.89 gr./cm.³ (20/20° C.), a boiling point of 240° C. (2 mm./Hg) and a flash point of 216° C.

Production of composition

At first the plastifier (c) was dispersed in the acrylonitrile-butadiene-styrene copolymer (b) via an intimate mixing of the two components for a period of 10 minutes at a temperature of 60° C.

Subsequently the mixture of the two components (b) and (c) was added to the polyvinylchloride compounded as explained previously and further mixing was completed in a Henschel mixer.

For every 100 parts by weight of mixture; 80 parts by weight of vinyl-chloride polymer, 8 parts by weight of plastifying and fluidifying agent, 12 parts by weight of ABS terepolymer were used.

Conditions and apparatus for the injection molding

An Ankerwerke V24–200 injection-molding press was used. The temperatures in the successive working zones of the molding press were: zone 1=170° C., zone 2=190° C., zone 3=190° C., and zone 4=190° C.

Technical data of the press

Semiautomatic control injection by rotating worm-screw:

| | |
|---|---|
| Injection pressure | atm 70 |
| Stroke | mm 85 |
| Counterpressure | atm 20 |
| Screw speed | rpm 32 |
| Die temperature (during operation) | ° C 60 |
| Duration of molding cycle | seconds 60 |
| Molded object (tray) | mm 18 x 24 x 2 |
| Sprue injection: | |
|   Cylinder diameter | mm 55 |
|   Nozzle type | SVO |

The resulting molded objects had a high toughness, high impact resistance in the cold state, a perfectly uniform and sufficiently bright surface independently of the quality of finish of the die surfaces. Furthermore, during the molding stage no trouble arose due to degradation of the molding material or to packing of the die.

EXAMPLE II

Preparation of the components of the injection-molding composition (a) Vinyl-chloride polymer.—100 parts by weight of polyvinylchloride with a Fickentscher K-number of 65 were mixed together with 2.5 parts by weight of lead sulphate, 2 parts by weight of dibasic lead phosphite and 3 parts by weight of lead stearate in a Henschel mixer.

(b) Styrene-acrylonitrile-butadiene (ABS) copolymer.—Following the same procedure as described in Example I and starting from a latex containing 109.5 gm. of the synthetic elastomer polybutadiene—to which were added 278 gm. of water, 73 gm. of a monomeric mixture containing 75% by weight styrene, and 25% by weight acrylonitrile—a graft polymer was obtained whose composition was found to be: butadiene=60% by weight, styrene=30% by weight, and acrylonitrile=10% by weight.

(c) Plastifying and fluidifying agent.—The same product as that one of the preceding example was used.

Production of mixture

The mixing of the three components was carried out following the same procedures as in the preceding example.

For every 100 parts by weight of the moldable mixture; 80 parts by weight of vinyl-chloride polymer (component a), 12 parts by weight of styrene-acrylonitrile-butadiene copolymer (component b), and 8 parts by weight of plastifying and fluidifying agent (component c) were used. This mixture was then subjected to injection molding by the same apparatus and under the same operational conditions as described in the preceding example.

Products were thereby obtained which were characterized by the same good properties as those of the products obtained following the procedures described in the preceding example.

EXAMPLE III

Preparation of the components of the injection-molding composition (a) Vinyl-chloride polymer.—To 100 parts of polyvinylchloride with a Fickentscher K-number equal to 60 were added 4.5 parts of an atoxic stabilizer consisting of a mixture of calcium stearate and zinc stearate containing 0.1% by weight of metallic zinc; the mixing was carried out in a Henschel mixer.

(b) Styrene-acrylonitrile-butadiene copolymer.—The same thermoplastic material as that of component b of Example I was used.

(c) Plastifying and fluidifying agent.—A mixture of several substances was used, i.e.:

(1) epoxidized soybean oil with an iodine-number of about 8 and with a content of oxyranic oxygen=6–7%
(2) glycerine-monostearate
(3) dioctylsebacate In that mixture the three substances were present in the weight ratio of 3:1:6, respectively.

Preparation of moldable mixture

The mixing of the three components was carried out following the same procedures as described in Example I. For every 100 parts by weight of mixture; 70 parts by weight of the vinyl-chloride polymer, 20 parts by weight of the styrene-acrylonitrile-butadiene copolymer, and 10 parts by weight of the plastifying and fluidifying agent were used.

This mixture was then injection-molded by the same apparatus and under the same conditions as those of Example I.

The molded objects showed a high toughness and all the good properties found in the products made according to the procedures followed in Example I.

EXAMPLE IV

Preparation of the components of the molding composition (a) Vinyl-chloride polymer.—The same product as that one of the Example III was used.

(b) Styrene-acrylonitrile-butadiene copolymer.—The same product as that of Example I was used.

(c) Plastifying and fluidifying agent.—A mixture of epoxidized soybean oil (of similar characteristics as the one of the Example III), glycerine-monostearate and butylstearate in a weight ratio of 3:1:1, respectively, was used.

The mixing of the three components was performed according to the same procedures of the preceding examples. For every 100 parts by weight of the mixture, 70 parts by weight of vinyl-chloride polymer, 25 parts by weight of styrene-acrylonitrile-butadiene copolymer, and 5 parts by weight of fluidifying and plastifying agent, were used. This mixture, when subjected to injection-molding under the same conditions as those of Example I, led to products of the same good characteristics.

EXAMPLE V

Preparation of the components of the molding composition (a) Polyvinylchloride polymer.—The same product as that of Example I was used.

(b) Styrene-acrylonitrile-butadiene copolymer.—The same product as that of Example I was used.

(c) Fluidifying and plastifying agent.—An epoxyoctylstearate of the same characteristics as that of Example I was used.

The mixing of the three components was performed according to the same procedures as in Example I.

Several tests were carried out wherein for every 100 parts by weight of molding mixture, different amounts of each of the three components were used, i.e.:

| Test No. | Parts by weight | | | |
|---|---|---|---|---|
| | 5a | 5b | 5c | 5d |
| Component (a) | 77 | 72 | 62 | 67 |
| Component (b) | 15 | 20 | 30 | 25 |
| Component (c) | 8 | 8 | 8 | 8 |

All four formulations as above listed were subjected to injection-molding under the same conditions as set forth in Example I, even for prolonged periods of time, with successful results and yielded products of excellent characteristics.

EXAMPLE VI

Preparation of the components of the molding composition (a) Vinyl-chloride polymer.—The same product as that of Example I was used.

(b) Styrene-acrylonitrile-butadiene copolymer.—Operating according to the same procedures described in Example I and starting from a latex containing 109.5 gm. of elastomeric polybutadiene—to which were added 510 gm. of water and 135.6 gm. of a monomer mixture of 75% by weight styrene and 25% by weight acrylonitrile, a graft copolymer was obtained whose composition was found out to be: butadiene=45% by weight, styrene=41.25% by weight and acrylonitrile=13.75% by weight.

(c) Plastifying and fluidifying agent.—An epoxyoctylstearate having the same characteristics of those mentioned in Example I was used.

The mixing of the three components was carried out according to the procedures described in Example I.

For every 100 parts by weight of the mixture the following amounts were used: 80 parts by weight of polyvinylchloride, 12 parts by weight of styrene-acrylonitrile-butadiene copolymer, and 8 parts by weight of the fluidifying and plastifying agent. The thus resulting mixture, when submitted to molding under the same conditions as those of Example I yielded products of the same good characteristics.

We claim:
1. A thermoplastic composition for injection molding consisting essentially of an intimate blend of:
- 51 to 98% by weight of a vinylchloride polymer containing at least 85% chemically combined vinylchloride and having a Fickentscher K number between 40 and 80;
- 1 to 40% by weight of an acrylonitrile-butadiene-styrene graft copolymer formed by polymerizing a mixture comprising a styrene monomer and an acrylonitrile monomer with a latex of a synthetic elastomer containing at least 85% by weight of polymerized butadiene, the graft copolymer consisting essentially of:
  - 30 to 60% by weight polymerized butadiene,
  - 30 to 52.5% by weight of said styrene monomer in polymerized form and
  - 10 to 17.55% by weight of said acrylonitrile monomer in polymerized form; and
- 1 to 15% by weight of a plastifying component constituted of a mixture of epoxidized soybean oil, glyceryl monostearate and dioctyl sebacate or butyl stearate.

2. The composition defined in claim 1 wherein said plastifying component is constituted of a mixture of epoxidized soybean oil, glyceryl monostearate and dioctyl sebacate and the weight ratio between said epoxidized soybean oil, said glyceryl monostearate and said dioctyl sebacate is 3:1:6.

3. The composition defined in claim 1 wherein said plastifying component is constituted of a mixture of epoxidized soybean oil, glyceryl monostearate and butyl stearate and the weight ratio of said epoxidized soybean oil, said glyceryl monostearate and said butyl stearate is substantially 3:1:1.

References Cited

UNITED STATES PATENTS

| | | | |
|---|---|---|---|
| 2,857,341 | 10/1958 | Colwell et al. | 260—23 |
| 2,997,454 | 7/1962 | Leistner et al. | 260—45.75 |
| 3,043,795 | 7/1962 | Roberts et al. | 260—23 X |
| 3,047,533 | 7/1962 | Calvert | 260—876 |
| 3,053,800 | 9/1962 | Grabowski et al. | 260—876 |
| 3,145,187 | 8/1964 | Hankey et al. | 260—23 X |
| 3,167,598 | 1/1965 | Heaps et al. | 260—876 |

FOREIGN PATENTS

| | | |
|---|---|---|
| 841,889 | 7/1960 | Great Britain. |

DONALD E. CZAJA, *Primary Examiner.*

R. A. WHITE, *Assistant Examiner.*